US006372136B1

United States Patent
Nakatsuka

(10) Patent No.: US 6,372,136 B1
(45) Date of Patent: Apr. 16, 2002

(54) CELLULOSE ACETATE SEMIPERMEABLE MEMBRANE AND PROCESS FOR PRODUCING THE CELLULOSE ACETATE SEMIPERMEABLE MEMBRANE

(75) Inventor: Shuji Nakatsuka, Hyogo (JP)

(73) Assignee: Daicel Chemical Industries, Ltd., Sakai (JP)

(*) Notice: Subject to any disclaimer, the term of this patent is extended or adjusted under 35 U.S.C. 154(b) by 0 days.

(21) Appl. No.: 09/529,134

(22) PCT Filed: Apr. 28, 1999

(86) PCT No.: PCT/JP99/02290

§ 371 Date: Apr. 5, 2000

§ 102(e) Date: Apr. 5, 2000

(87) PCT Pub. No.: WO00/09247

PCT Pub. Date: Feb. 24, 2000

(30) Foreign Application Priority Data

Aug. 11, 1998 (JP) .......................................... 10-226636

(51) Int. Cl.⁷ .............................................. B01D 69/08
(52) U.S. Cl. .......................... 210/500.23; 210/500.29; 210/500.3; 210/500.31; 210/500.32; 210/500.33; 210/500.27; 264/41; 264/45.1
(58) Field of Search ..................... 210/500.29, 500.3, 210/500.31, 500.32, 500.23, 500.27; 264/45.1, 41, 178.2

(56) References Cited

U.S. PATENT DOCUMENTS 4,323,627 A * 4/1982 Joh
5,849,189 A * 12/1998 Emi et al.
6,177,181 B1 * 1/2001 Hamada et al.

FOREIGN PATENT DOCUMENTS

| JP | 58-24164 | 5/1983 |
| JP | 60-43442 | 9/1985 |
| JP | 6-343842 | 12/1994 |
| JP | 7-165938 | 6/1995 |
| JP | 8-108053 | 4/1996 |
| JP | 10-305220 | 11/1998 |
| JP | 10305220 | * 11/1998 |

* cited by examiner

*Primary Examiner*—Ana Fortuna
(74) *Attorney, Agent, or Firm*—Flynn, Thiel, Boutell & Tanis, P.C.

(57) ABSTRACT

To provide a cellulose acetate semipermeable membrane having a high filtration rate and high mechanical strength and which is hardly degraded by microorganisms, the present invention provides a cellulose acetate semipermeable membrane containing a cellulose acetate having an α-cellulose content of not less than 99% by weight, a 6 wt/vol % viscosity of 20 to 220 mPa·s at 25±1° C. and an acetylation degree of 58 to 62%. The cellulose acetate semipermeable membrane is suitable particularly as a hollow fiber membrane.

6 Claims, 3 Drawing Sheets

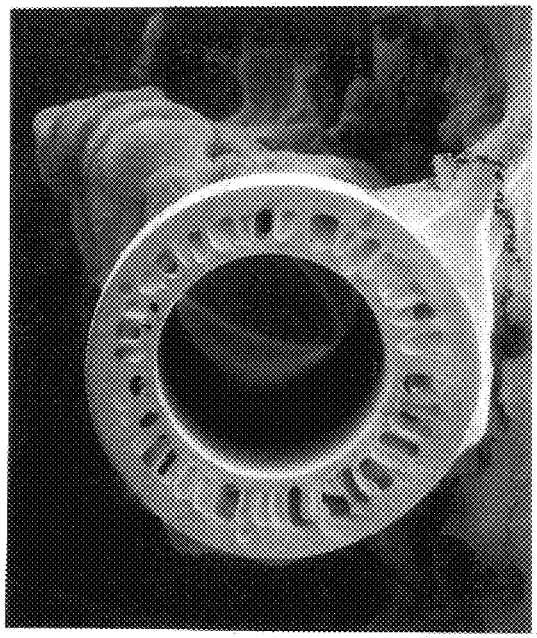
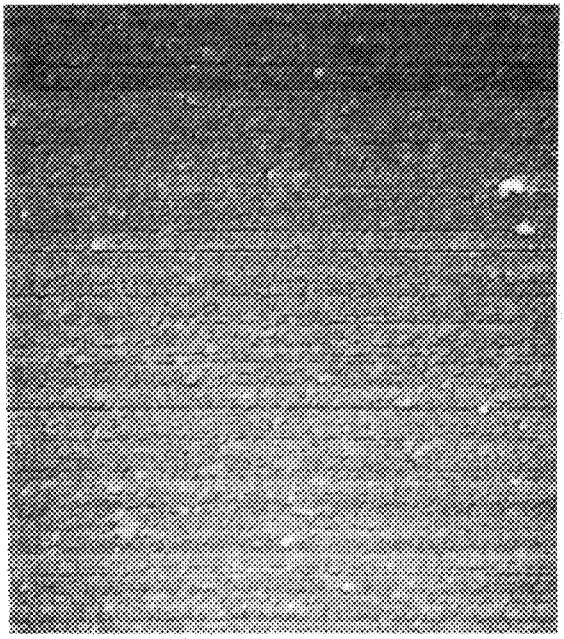
FIG. 3
FIG. 4

CELLULOSE ACETATE SEMIPERMEABLE MEMBRANE AND PROCESS FOR PRODUCING THE CELLULOSE ACETATE SEMIPERMEABLE MEMBRANE

FIELD OF THE INVENTION

The present invention relates to a cellulose acetate semipermeable membrane used for separation and concentration treatment in various fields besides water treatments such as drinking water treatment, sewage treatment and waste water treatment, and a process for producing the cellulose acetate semipermeable membrane.

PRIOR ART

Heretofore, a cellulose acetate membrane has been used as a material of separation membrane for various kinds of water treatment and for medical use in blood dialysis etc., for the reason of hydrophilicity and a little decrease in filtration rate, and widely used at present particularly in the form of a reverse osmosis membrane. For demand in practical use, the reverse osmosis membrane made of cellulose acetate is often constructed such that a separation active layer in the membrane is made very dense with a membrane pore diameter of 0.001 $\mu$m or less, but there arise various problems attributable to the membrane structure.

For example, JP-B 58-24164 discloses a reverse osmosis membrane made of cellulose acetate having a dense layer. However, since this reverse osmosis membrane has a dense layer, the operating pressure should be kept at high pressure as high as 1 MPa or more to increase the filtration rate, which however leads to problems including not only an increase in energy cost but also a decrease in water permeation rate and mechanical breakage of the membrane due to the compaction and densification of the membrane during filtrating operation. For application of this membrane to a blood dialysis membrane, the membrane thickness has been rendered thin to raise the plasma separation rate, but this results in the general problem of easy breakage at low pressure.

The reverse osmosis membrane made of cellulose acetate has another problem that pinholes are generated due to the presence of micro-voids. JP-B 60-43442 discloses a method for suppressing the generation of pinholes and for improving membrane strength. However, this prior art does not solve the problem of a decrease in filtration rate during practical use, because the membrane has a substantially uniform structure containing no void layer.

JP-A 6-343842 and JP-A 8-108053 disclose a cellulose acetate hollow fiber separation membrane having a three-dimensional network-like part and a void part.

Another requirement of such a membrane material for various kinds of water treatment is that it is hardly degraded by microorganisms in order to suppress a decrease in its filtration ability and to increase the longevity of the membrane thus preventing an increase in operating cost.

The object of the present invention is to provide a cellulose acetate semipermeable membrane which has a high filtration rate at a low pressure, has high mechanical strength and is hardly degraded by microorganisms, and a process for producing the cellulose acetate semipermeable membrane.

Further, JP-A10-305220discloses a hollow fiber membrane fabricated by discharging a membrane-forming solution through a double pipe type spinning orifice while discharging an inside coagulating solution from a central pipe of the spinning orifice.

DISCLOSURE OF THE INVENTION

As a result of their eager study on the structure of cellulose acetate serving as the starting material for production of semipermeable membranes, the present inventor have found that 3 elements relating to the structure described above, which are specified by connecting them with one another, can act synergistically to achieve the object described above, thus completing the present invention.

That is, the present invention provides a cellulose acetate semipermeable comprising a cellulose acetate produced from cellulose having an $\alpha$-cellulose content of not less than 99% by weight, and having a 6 wt/vol % viscosity at 25±1° C. of 20 to 220 mPa·s and an acetylation degree of 58 to 62%. Also, it provides use of the cellulose acetate as a semipermeable membrane or a hollow fiber membrane.

Preferably, the semipermeable membrane is a hollow fiber membrane.

Further, the present invention provides a cellulose acetate hollow fiber membrane, wherein the thickness of the hollow fiber membrane is 100 to 400 $\mu$m, the cross-section of the hollow fiber membrane is composed of a three-dimensional network-like part and a void part, the void part is positioned inside 10 $\mu$m or more from both internal and external surfaces of the membrane, the area occupied by the void part is in the range of 5 to 60% of the total cross-sectional area of the membrane, a dense layer having a surface average pore size of 0.001 to 0.05 $\mu$m exists on each of the internal and external surfaces of the hollow fiber, and a crack-like muscular pattern (slit structure) is observed on the internal surface of the hollow fiber with an electron microscope at a magnification of ×20,000.

Preferably, the cellulose acetate is produced from cellulose having an $\alpha$-cellulose content of not less than 99% by weight. Preferably, the 6% viscosity thereof is 50 to 200 mPa·s, and the acetylation degree thereof is 60.5 to 61.5%.

Further preferably, the pure water permeation rate is not less than 500 l/(m$^2$·h), and the tensile strength at break is not less than 4 MPa.

Further, the present invention provides a process for producing a cellulose acetate semipermeable membrane, wherein a solution of the above-described cellulose acetate dissolved in a water-soluble, organic polar solvent, for example, dimethyl sulfoxide, N-methyl-2-pyrrolidone or dimethylacetamide, is used to produce the membrane.

Preferably, the solution is formed into a hollow fiber membrane by applying a wet or dry wet spinning process using a double pipe type spinning orifice.

Preferably, at least one selected from compounds containing metallic elements of the I to III groups of the periodic table, ethylene glycol and polyethylene glycol are dissolved with cellulose acetate.

Further, the present invention provides a process for producing a cellulose acetate hollow fiber membrane wherein the thickness of the membrane is 100 to 400 $\mu$m, the cross-section of the hollow fiber membrane is composed of a three-dimensional network-like part and a void part, the void part is positioned inside 10 $\mu$m or more from both internal and external surfaces of the membrane, the area occupied by the void part is in the range of 5 to 60% of the total cross-sectional area of the membrane, a dense layer having a surface average pore diameter of 0.001 to 0.05 $\mu$m exists on each of the internal and external surfaces of the follow fiber, and a crack-like muscular pattern (slit structure) is observed on the internal surface of the hollow fiber with an electron microscope at a magnification of ×20,000, comprising dissolving a cellulose acetate in a water-soluble, organic polar solvent, and then discharging the resulting membrane-forming solution from a double pipe nozzle while discharging an inside coagulating solution from the inner pipe of the double pipe to coagulate the membrane-forming solution in a coagulation bath.

Preferably, the linear velocity of the inside coagulating solution discharged is 8 times or more as high as the linear velocity of the membrane-forming solution discharged.

Preferably, the membrane-forming solution contains a compound containing metallic elements of the I to III groups of the periodic table in an amount of 0.2 to 1.5% by weight therein.

In addition, the present invention provides use, as water treatment or separation and concentration treatment, of a cellulose acetate hollow fiber membrane in which the thickness of the hollow fiber membrane is 100 to 400 $\mu$m, a cross-section of the hollow fiber membrane consists of a three-dimensional network-like part and a void part, the void part is positioned 10 $\mu$m or more inside from both internal and external surfaces of the membrane, the area occupied by the void part is in the range of 5 to 60% of the total cross-sectional area of the membrane, each of the internal and external surfaces of the follow fiber has a dense layer having a surface average pore size of 0.001 to 0.05 $\mu$m, and a crack-like muscular pattern (slit structure) is observed on the internal surface by observation under an electron microscope at a magnification of ×20,000.

Further additionally, the present invention provides a method of conducting water treatment or separation and concentration treatment using a cellulose acetate hollow fiber membrane in which the thickness of the hollow fiber membrane is 100 to 400 $\mu$m, a cross-section of the hollow fiber membrane consists of a three-dimensional network-like part and a void part, the void part is positioned 10 $\mu$m or more inside from both internal and external surfaces of the membrane, the area occupied by the void part is in the range of 5 to 60% of the total cross-sectional area of the membrane, each of the internal and external surfaces of the hollow fiber has a dense layer having a surface average pore size of 0.001 to 0.05 $\mu$m, and a crack-like muscular pattern (slit structure) is observed on the internal surface by observation under an electron microscope at a magnification of ×20,000.

The cellulose acetate semipermeable membrane of the present invention exhibits a high filtration rate and high mechanical strength and is hardly degraded by microorganisms because the cellulose acetate as the starting material satisfies the prescribed 3 elements i.e. $\alpha$-cellulose content, 6% viscosity at 25±1° C. and acetylation degree. Further, it is also excellent in that the procedure of forming the membrane is easy.

The cellulose acetate hollow fiber membrane of the present invention is highly reliable, since it is excellent in water permeability, has high mechanical strength and shows a suppressed generation of membrane defects such as pinholes.

Further, the membrane is preferable in the case of the following conditions:

Size of the void part: 10 to 200 $\mu$m.

Size of the slit: 0.05 to 1.0 $\mu$m length,
    0.005 to 0.2 $\mu$m width,
    slit length/slit width=5 to 50,
    at least one slit per $\mu$m$^2$ is observed under an SEM at a magnification of ×20, 000.

MODE FOR CARRYING OUT THE INVENTION

Hereinafter, with the explanation of an example of the process for producing a cellulose acetate semipermeable membrane according to the present invention, the cellulose acetate semipermeable membrane is illustrated.

Cellulose acetate as the raw material of the cellulose acetate semipermeable membrane has a specific structure satisfying the prescribed 3 elements as described below, but the cellulose itself as the starting material is not particularly limited, and plant cellulose such as industrial pulps, linters etc., bacterial cellulose and regenerated cellulose such as rayon may be used. Among these, cotton linters are preferable.

The cellulose acetate is the one having an $\alpha$-cellulose content of not less than 99% by weight, preferably not less than 99.5% by weight. If the content of $\alpha$-cellulose is not less than 99% by weight, a gel content not dissolved in the membrane-forming solution is reduced so that the generation of pinholes can be suppressed and the strength of the membrane can also be increased.

The 6% based wt/vol, herein after, viscosity at 25±1° C. of the cellulose acetate is 20 to 220 mPa·s, preferably 50 to 180 mPa·s. When the 6% viscosity is within the range defined above, the procedure of forming the membrane is facilitated so that the membrane can be produced even when the temperature of the membrane-forming solution is kept at relatively low temperature (100° C. or less).

Further, the cellulose acetate is the one having acetylation degree of 58 to 62%, preferably 60 to 62%, particularly preferably 60.5 to 61.5. When the acetylation degree is within the range described above, the resulting membrane is hardly degraded by microorganisms, thus prolonging duration of the membrane and improving the spinning properties thereof. The acetylation degree is determined by the measurement method prescribed in Examples.

The cellulose acetate used in the present invention is preferably the one wherein the number of insolubles with a particle diameter of 3 to 100 $\mu$m per mg cellulose acetate is preferably 10 or less, particularly preferably 5 or less. When the number of insolubles is 10 or less, it is possible to prevent occurrence of problems such as breakage of the membrane during membrane manufacturing or generation of pinholes by preventing formation of the membrane structure via phase conversion. Accordingly, in pre-treatment prior to membrane-forming, insolubles in the cellulose acetate are preferably removed by filtration under a pressure through a solvent-resistant filter having a pore diameter of 10 $\mu$m or less, preferably 0.5 to 5 $\mu$m, such as a sintered metal filter, a filter paper, a filter cloth, a PTFE membrane filter etc.

In the present invention, the above-mentioned cellulose acetate is dissolved in dimethyl sulfoxide, N-methyl-2-pyrrolidone or dimethylacetamide to prepare a membrane-forming solution.

As the solvent, the above-mentioned 3 organic solvents maybe used alone or in combination thereof as necessary. Along with these solvents, 1,4-dioxane, N,N-dimethylformamide, 2-pyrrolidone and/or $\gamma$-butyrolactone may be used in combination.

The amount of the solvent used is such that the concentration of cellulose acetate in the membrane-forming solution is made preferably 10 to 30% by weight, particularly preferably 15 to 23% by weight.

Along with the cellulose acetate, a compound containing metallic elements of the I to III groups of the periodic table may be dissolved therein. The compound includes at least one selected from acetates, halides such as chloride etc., nitrates, thiocyanates and hydrates of alkali metals such as Li, Na and K or alkaline earth metals such as Mg and Ca. Among these, lithium chloride, magnesium chloride, lithium acetate and magnesium acetate having high solubility are preferable. Further, a non-solvent such as ethylene glycol and polyethylene glycol may be added.

Preferably, the amount of the above-mentioned compound added is 0.05 to 5% by weight and the amount of the non-solvent added is 1 to 30% by weight to the total weight of the membrane-forming solution, in order to improve both the water permeability and strength of the membrane, and to facilitate the procedure of forming the membrane by preventing an increase in viscosity.

The process of forming the membrane varies depending on the type of the desired membrane, and the process of forming the membrane according to the type of membrane such as flat membrane, spiral, tube and hollow fiber may be applied. For example, the spinning process using a double pipe type spinning orifice as described below can be applied to the forming of the hollow fiber membrane. The spinning process may be either a wet process or a dry wet process.

In the case of the wet process, the membrane-forming solution is discharged from an outer pipe of a double pipe type spinning orifice, while an inside coagulating solution is discharged from an inner pipe to coagulate the solution in a coagulation bath. Both the temperature of the inside coagulating solution and the temperature of the coagulation bath are preferably in the range of 30 to 80° C., to give the hollow fiber membrane having a dense layer of suitable thickness.

In the case of the dry wet process, the distance of a drying part between the discharge part of the spinning orifice and the coagulation bath is preferably 0.1 to 50 cm, particularly preferably 0.3 to 30 cm, and preferably the solution is introduced into the coagulation bath, after passing the air for 0.2 second or more at the distance mentioned above. The temperature of the coagulation bath is the same temperature range as in the wet process.

The solvent used in the inside coagulating solution or in the coagulation bath is the one which does not dissolve cellulose acetate and is compatible with the solvent used in forming the membrane, and as examples, water, ethylene glycol, polyethylene glycol etc. may be proposed. The compound used in preparing the membrane-forming solution may also be added to the inside coagulating solution or the coagulation bath.

When the cellulose acetate semipermeable membrane of the present invention is a hollow fiber membrane, the hollow fiber membrane preferably has the following structure:

The hollow fiber membrane preferably has a dense layer on the internal or external surface of the membrane and has both a three-dimensional network-like porous part having porosity and a void part in the inside of the membrane.

The dense layer is present in a depth of substantially up to 1/100 of the membrane thickness from the internal or external surface of the membrane, and the surface average pore diameter is preferably in the range of 0.001 to 0.05 $\mu$m, particularly preferably 0.005 to 0.03 $\mu$m, and the numerical range corresponds to molecular weight cut-off of 10,000 to 500,000. For example, the decrease in filtration rate caused by penetration of suspending particles in a treated fluid into the inside of the membrane can be prevented by regulating the surface average pore size within the range defined above.

The three-dimensional network-like porous part is formed in the remainder of the density layer, and the average pore diameter of the void is smaller than the average pore diameter of the dense layer, and is substantially in the range of 0.05 to 1 $\mu$m. When the average pore diameter is in this range, high mechanical strength and ductility can be conferred on the hollow fiber membrane.

The void part coexists with the three-dimensional network-like porous part and consists of round or elliptical voids (porosity) which are larger, substantially 10 to 200 $\mu$m in size, than voids in the three-dimensional porous part and having little filtration resistance against a permeating fluid. The ratio of the area occupied by the void part to the cross-sectional area of the membrane is preferably 5 to 60%, particularly preferably 20 to 50%. When the ratio of the area occupied by the void part is within the range defined above, the filtration rate can be increased, and further mechanical strength such as tensile strength and burst pressure can be raised.

The membrane thickness is preferably 50 to 500 $\mu$m, more preferably 100 to 400 $\mu$m. When the membrane thickness is within the above range, the filtration rate and mechanical strength can be raised.

By constructing the hollow fiber membrane as the above structure, the filtration rate can be raised without deteriorating the mechanical strength of the membrane, as compared with a hollow fiber membrane having a gradient-type porous layer having a continuously increasing pore diameter from the surface of the membrane with the minimum pore diameter to the inside of the membrane.

BRIEF DESCRIPTION OF THE DRAWINGS

FIG. 3 is an electron microphotograph at a magnification of ×50 of a cross-section of the cellulose acetate hollow fiber membrane in Comparative Example 6.

FIG. 4 is an electron microphotograph at a magnification of ×20,000 of the internal surface of the cellulose acetate hollow fiber membrane in Comparative Example 6.

EXAMPLES

Figure 1:
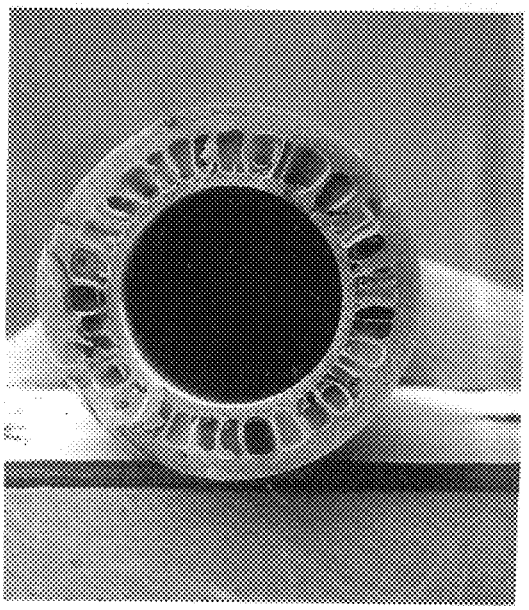
FIG. 1 is an electron microphotograph at a magnification of ×50 of a cross-section of the cellulose acetate hollow fiber membrane in Example 4 of the present invention.

Hereinafter, the present invention is described more in detail by reference to Examples, which however are not intended to limit the present invention. The measurement of cellulose acetate and cellulose acetate semipermeable membranes given below was conducted in the following method.

(1) 6% viscosity 61.67 g of a mixed solvent (methylene chloride:methanol=91:9 (ratio by weight)) was placed in an Erlenmeyer flask, 3.00 g of a sample dried at 105±5° C. for 2 hours was introduced thereinto, and then the flask was sealed. Thereafter, it was shaken for about 1.5 hours in a shaking bath and further shaken for about 1 hour in a rotary shaker, whereby the sample was completely dissolved.

Then, the temperature of the resulting 6 wt/vol % solution was adjusted to 25±1° C. in a thermostat, and the time of downward flowing required for the downward flowing solution to pass through two marked lines was determined with the Ostwald viscometer. The viscosity was determined from the following equation:

6% viscosity (mPa·s)=time of downward flowing (sec)/viscometer coefficient.

The viscometer coefficient was determined from the following equation after the time (sec) of downward flowing of a standard solution for viscometer calibration was measured in the same manner as above.

Viscometer coefficient=[absolute viscosity of the standard solution (mPa·s)×density of the solution (1.235 g/cm$^3$)/[density of the standard solution (g/cm$^3$)×time of downward flowing of the standard solution (sec)]

(2) Acetylation degree 1.9 g of a ground sample was placed in a weighing bottle, dried at 105±5° C. for 2 hours, and then cooled as it was for about 40 minutes in a desiccator. It was accurately weighed and transferred to an Erlenmeyer flask, and the emptied weighing bottle was accurately weighted again, and the difference between these weights was assumed to be the weight of the sample. After about 70 ml acetone was added to the Erlenmeyer flask and stirred for about 30 minutes, about 30 ml dimethyl sulfoxide was added thereto and stirred for about 10 minutes, whereby the sample was completely dissolved. Thereafter, about 50 ml acetone was added thereto and stirred for about 5 minutes. Then, 30 ml of 1 N NaOH was added thereto under slow stirring, and the mixture was stirred about 2 hours. Thereafter, about 100 ml hot water of 80 to 90° C. was added thereto and stirred for about 15 minutes. A phenolphthalein solution was added as an indicator, and the solution was titrated with 1N H$_2$SO$_4$ until its pale red color disappeared. The titration amount was expressed as A ml, while a blank test was conducted and the titration amount thereof was expressed as B ml, and the acetylation degree was determined by the following equation. "F" in the equation is the factor of 1N H$_2$SO$_4$.

Acetylation degree (%)=[(B−A)×F×6.005]/sample weight (g)

(3) Pure water permeation rate

The inside of a hollow fiber membrane having an effective length of 50 cm was pressurized with pure water at 25° C. at a water pressure of 100 kPa to determine the amount of filtered pure water (internal surface area standard).

(4) Tensile strength at break

Tensile strength at break, as determined by moving a cross-head at a rate of 10 mm/min against a hollow fiber membrane with an effective length of 5 cm, was converted to that of per cm$^2$ cross-section of the hollow fiber membrane.

(5) Microbial degradability

Cellulose acetate semipermeable membranes were immersed for 100 days in water from the Ibo river downstream. The semipermeable membranes after the immersion whose tensile strength at break after the immersion exceeded 80% of the strength before the immersion were regarded as being not microbially degradable, while those coming to have the strength of not more than 80% were regarded as being microbially degradable.

Example 1

After stirring and dissolving 20% by weight cellulose acetate shown in Table 1 and 80% by weight dimethyl sulfoxide at 90° C., the resulting solution was filtered using a filter paper (Toyo Roshi No. 63) to give a membrane-forming solution. The membrane-forming solution was discharged at a pressure of 0.5 MPa and at a discharge temperature of 90° C. from outside of a double pipe type spinning orifice, while water of 70° C. as an inside coagulating solution was discharged from an inner pipe. After passing the air for 0.5 second, it was coagulated in a water bath at 70° C., spun at a wind-up rate of 12 m/min and then the solvent was thoroughly removed in a washing bath. The resulting hollow fiber membrane had an inner diameter of 0.8 mm and an outer diameter of 1.3 mm. The results of each measurement are shown in Table 1.

Comparative Examples 1 to 3

Hollow fiber membranes with the same dimension were obtained in the same manner as in Example 1, except that the cellulose acetate shown in Table 1 was used. The results of each measurement are shown in Table 1.

Example 2

A membrane-forming solution was prepared from 20% by weight of the cellulose acetate shown in Table 1, 79% by weight of dimethyl sulfoxide and 1% by weight of lithium chloride in the same manner as in Example 1. A hollow fiber membrane with the same dimension was prepared from the resulting membrane-forming solution in the same manner as in Example 1. The results of each measurement are shown in Table 1.

Comparative Example 4

A hollow fiber membrane with the same dimension was obtained in the same manner as in Example 2, except that the cellulose acetate shown in Table 1 was used. The results of each measurement are shown in Table 1.

Example 3

A membrane-forming solution was prepared from 20% by weight of the cellulose acetate shown in Table 1, 70% by weight of N-methyl-2-pyrrolidone and 10% by weight of ethylene glycol in the same manner as in Example 1. The resulting membrane-forming solution was discharged from outside of a double pipe type spinning orifice at a pressure of 0.6 MPa and at a discharge temperature of 90° C., while water of 70° C. as an inside coagulating solution was discharged from an inner pipe. After passing the air for 0.5 sec, it was coagulated in a water bath at 30° C. and spun at a wind-up rate of 12 m/min. Then, the solvent was removed sufficiently in a washing bath. The resulting hollow fiber membrane had an inner diameter of 0.8 mm and an outer diameter of 1.3 mm. The results of each measurement is shown in Table 1.

Comparative Example 5

A hollow fiber membrane with the same dimension was obtained in the same manner as in Example 3, except that the cellulose acetate shown in Table 1 was used. The results of each measurement are shown in Table 1.

TABLE 1

|  | Cellulose acetate | | | Cellulose acetate semipermeable membrane | | |
| --- | --- | --- | --- | --- | --- | --- |
|  | α-cellulose content (wt %) | 6% viscosity (mPa · S) | acetylation degree (%) | pure water permeation rate (L/m² · h) | tensile strength at break (MPa) | degradation by a microorganism |
| Example 1 | 99.8 | 96 | 61.4 | 510 | 5.6 | not degradable |
| Comparative Example 1 | 99.8 | 275 | 60.8 | — | — | — |
| Comparative Example 2 | 97.6 | 93 | 61.6 | 430 | 4.7 | not degradable |
| Comparative Example 3 | 99.7 | 95 | 55.6 | 490 | 5.2 | degradable |
| Example 2 | 99.8 | 68 | 61.0 | 580 | 5.7 | not degradable |
| Comparative Example 4 | 97.6 | 93 | 61.6 | 550 | 5.1 | not degradable |
| Example 3 | 99.8 | 96 | 61.4 | 230 | 5.8 | not degradable |
| Comparative Example 5 | 97.6 | 93 | 61.6 | 180 | 5.6 | not degradable |

As is evident from comparisons between the counterparts, that is, between Example 1 and Comparative Examples 1 to 3, Example 2 and Comparative Example 4, and Example 3 and Comparative Example 5, respectively, the cellulose acetates in Examples 1 to 3 satisfied the prescribed 3 elements acting synergistically, resulting in superiority in any items of permeation rate, tensile strength at break and microbial degradability. Further, whether pinholes were present or not was confirmed by sealing one end of each hollow fiber membrane (dry weight: 100 g) in Examples 1 to 3, pressurizing the other end with a nitrogen gas at 300 kPa for 10 minutes or more, and then determining the number leaked, and as a result, no pinhole was recognized in any of the membranes. The viscosity was high in Comparative Example 1, so that spinning was not feasible even at a discharge pressure of 0.7 MPa at the time of spinning.

Example 4

Figure 2:
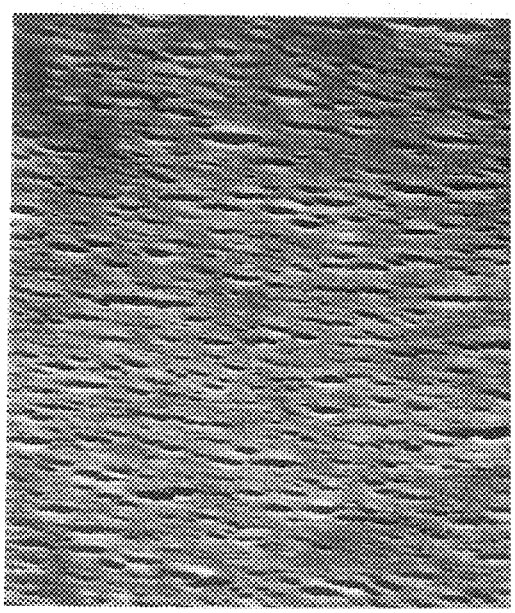
FIG. 2 is an electron microphotograph at a magnification of ×20,000 of the internal surface of the cellulose acetate hollow fiber membrane in Example 4 of the present invention.

A membrane-forming solution consisting of 18 wt % cellulose acetate (degree of acetylation: 61.0%, the viscosity of 6%: 120 mPa·s, α-cellulose content: 99.5 wt %), 81 wt % dimethyl sulfoxide and 1 wt % lithium chloride was discharged from outside of a double pipe nozzle (1.5×0.63× 0.33), while water of 70° C. as an inside coagulating solution was discharged from an inner pipe. In this step, the amount of the membrane-forming solution discharged was 12 g/min, while the amount of the inside coagulating solution discharged was 30 g/min, and the ratio of linear velocity of both of the fluids was 11.2. After passing the air for 1 second, the membrane-forming solution was coagulated from the outer surface thereof in a coagulation bath at 70° C., and then immersed in a water bath at 50° C. to remove the solvent. The resulting hollow fiber membrane had an inner diameter of 0.8 mm and an outer diameter of 1.3 mm, and the spinning rate was 12 m/min. An electron microphotograph of a cross-section of the resulting hollow fiber membrane at a magnification of ×50 is shown in FIG. 1. The ratio of the area occupied by the void part to the total cross-sectional area of the membrane was 35%, the pure water permeation rate when the inside of the hollow fiber membrane was pressurized with pure water at 100 kPa was 750 L/m²h, the γ-globulin permeability was 10%, and the tensile strength was 5.8 MPa. FIG. 2 shows an electron microphotograph of the internal surface of the resulting membrane at a magnification of ×20,000. A slit structure of 0.1 to 0.3 μm in length and 0.01 to 0.05 μm in width was observed on the internal surface.

Comparative Example 6

A hollow fiber membrane was prepared in the same manner as in Example 4, except that the membrane-forming solution of Example 4 was discharged from outside of a double pipe nozzle (2.0×0.80×0.50), while water of 60° C. as an inside coagulating solution was discharged from an inner pipe, the amount of the membrane-forming solution discharged was 15 g/min, while the amount of the inside coagulating solution discharged was 22 g/min, and the ratio of linear velocity of both the fluids was 5.1. An electron microphotograph of a cross-section of the resulting hollow fiber membrane at a magnification of ×50 is shown in FIG. 3. The ratio of the area occupied by the void part to the total cross-sectional area was 30%, the pure water permeation rate when the inside of the hollow fiber membrane was pressurized with pure water at 100 kPa was 450 L/m²h, the γ-globulin permeability was 10% and the tensile strength was 5.5 MPa. FIG. 4 shows an electron microphotograph of the internal surface of the resulting Membrane at a magnification of ×20,000. No slit structure was observed on the internal surface.

Example 5

Figure 5:
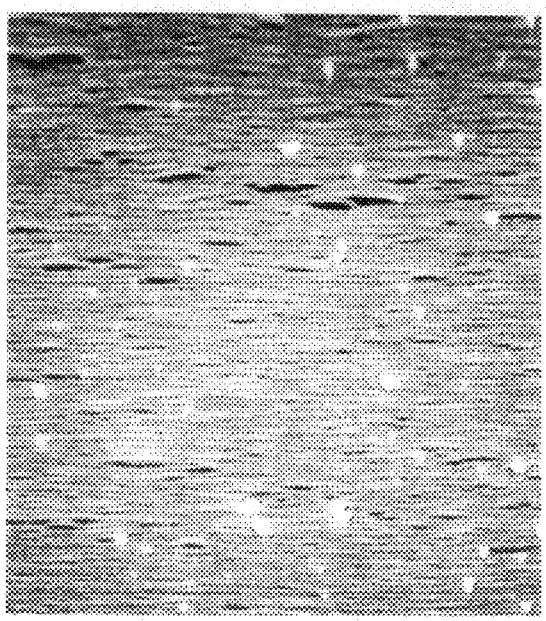
FIG. 5 is an electron microphotograph at a magnification of ×20,000 of the internal surface of the cellulose acetate hollow fiber membrane in Example 5 of the present invention.

A membrane-forming solution consisting of 18 wt % cellulose acetate (acetylation degree: 61.0%, 6% viscosity of 6%: 160 mPa·s, α-cellulose content: 99.5 wt %), 81 wt % dimethyl sulfoxide and 1 wt % lithium chloride was discharged from outside of a double pipe nozzle (1.5×0.63× 0.33), while water of 70° C. as an inside coagulation solution was discharged from an innerpipe. In this step, the amount of the membrane-forming solution discharged was 12 g/min, while the amount of the inside coagulating solution discharged was 32 g/min, and the ratio of linear velocity of both of the fluids was 10.1. After passing the air for 2 seconds, the membrane-forming solution was coagulated from the outer surface thereof in a coagulation bath at 70° C., and then immersed in a water bath at 50° C. to remove the solvent. The resulting hollow fiber membrane had an inner diameter of 0.8 mm and an outer diameter of 1.3 mm, and the spinning rate was 6 m/min. The ratio of the area occupied by the void part to the total cross-sectional area of the resultant hollow fiber membrane was 40%, the pure water permeation rate when the inside of the hollow fiber membrane was pressurized with pure water at 100 kPa was 1000 L/m²h, the γ-globulin permeability was 20%, and the tensile strength was 5.0 MPa. FIG. 5 shows an electron microphotograph of the inner surface of the membrane at a magnification of ×20,000. A slit structure of 0.1 to 0.3 μm in length and 0.01 to 0.05 μm in width was observed on the inner surface.

Comparative Example 7

Figure 6:
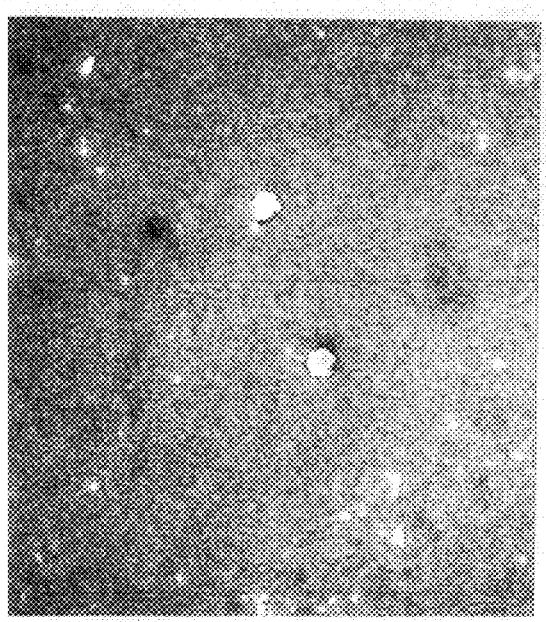
FIG. 6 is an electron microphotograph at a magnification of ×20,000 of the internal surface of the cellulose acetate hollow fiber membrane in Comparative Example 7.

A hollow fiber membrane was prepared in the same manner as in Example 4, except that a membrane-forming solution consisting of 18 wt % cellulose acetate (acetylation degree: 61.0%, 6% viscosity:160 mPa·s, α-cellulosecontent:99.5wt %) 80 wt % N-methyl-2-pyrrolidone and 2 wt % ethylene glycol was discharged from outside of a double pipe nozzle (2.0×0.80×0.50), while water of 60° C. as an inside coagulation solution was discharged from an inner pipe, the amount of the membrane-forming solution discharged was 14 g/min, while the amount of the inside coagulating solution discharged was 19 g/min, and the ratio of linear velocity of both of the fluids was 6.6. The ratio of the area occupied by the void part to the total sectional area of the resulting hollow fiber membrane was 28%, the pure water permeation flow rate when the inside of the hollow fiber membrane was pressurized with pure water at 100 kPa was 350 L/m$^2$h, the γ-globulin permeability was 8%, and the tensile strength was 5.1 MPa. FIG. 6 shows an electron microphotograph of the internal surface of the resulting membrane at a magnification of ×20,000. No slit structure was observed on the internal surface.

What is claimed is:

1. A cellulose acetate hollow fiber membrane, wherein the thickness of the hollow fiber membrane is 100 to 400 μm, the cross-section of the hollow fiber membrane is composed of a three-dimensional network part and a void part, the void part is positioned inside 10 μm or more from both internal and external surfaces of the membrane, the area occupied by the void part is in the range of 5 to 60% of the total cross-sectional area of the membrane, a dense layer having a surface average pore size of 0.001 to 0.05 μm exists on each of the internal and external surfaces of the hollow fiber, and a slit structure is observed on the internal surface of the hollow fiber with an electron microscope at a magnification of ×20,000.

2. The cellulose acetate hollow fiber membrane as claimed in claim 1, wherein the cellulose acetate is produced from cellulose having an α-cellulose content of not less than 99% by weight, and has a 6% viscosity of 50 to 200 mPa·s and an acetylation degree of 60.5 to 61.5%.

3. The cellulose acetate hollow fiber membrane as claimed in claim 2, which has a pure water permeation rate of not less than 500 l/(m$^2$·h) and a tensile strength at break of not less than 4 MPa.

4. A process for producing the cellulose acetate hollow fiber membrane as claimed in claim 1 comprising dissolving a cellulose acetate in a water-soluble, organic polar solvent and then discharging the resulting membrane-forming solution from a double pipe nozzle while discharging an inside coagulating solution from the inner pipe of the double pipe to coagulate the membrane-forming solution in a coagulation bath.

5. The process for producing a cellulose acetate hollow fiber membrane as claimed in claim 4, wherein the linear velocity of the inside coagulating solution discharged is 8 times or more greater than the linear velocity of the membrane-forming solution discharged.

6. The process for producing a cellulose acetate hollow fiber membrane as claimed in claim 4, wherein the membrane-forming solution contains a compound containing metallic elements of the I to III groups of the periodic table in an amount of 0.2 to 1.5% by weight therein.

* * * * *